Figure 1:
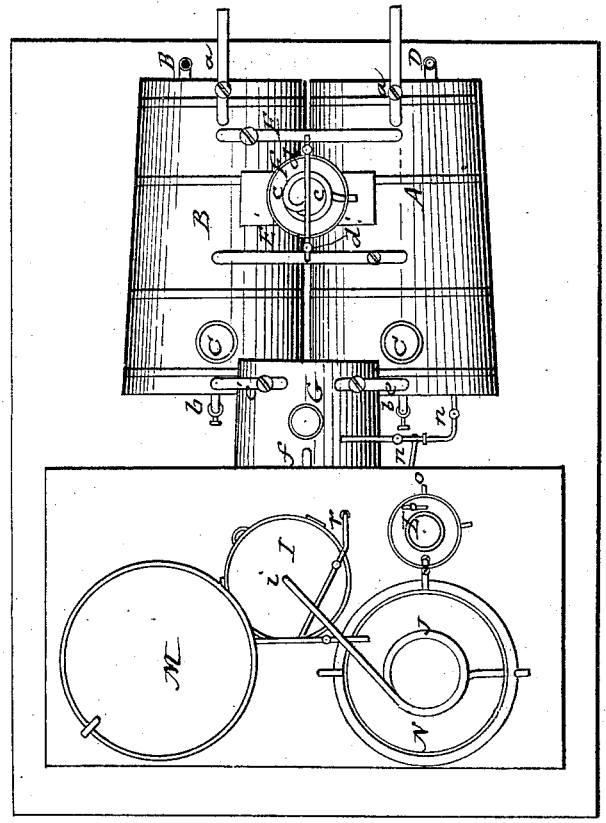

A. MEYENDORFF.

Alcohol Still.

2 Sheets—Sheet 1.

No. 78,678.

Patented June 9, 1868.

WITNESSES:

INVENTOR:
A. Meyendorff

A. MEYENDORFF.
Alcohol Still.
No. 78,678.
2 Sheets—Sheet 2.
Patented June 9, 1868.
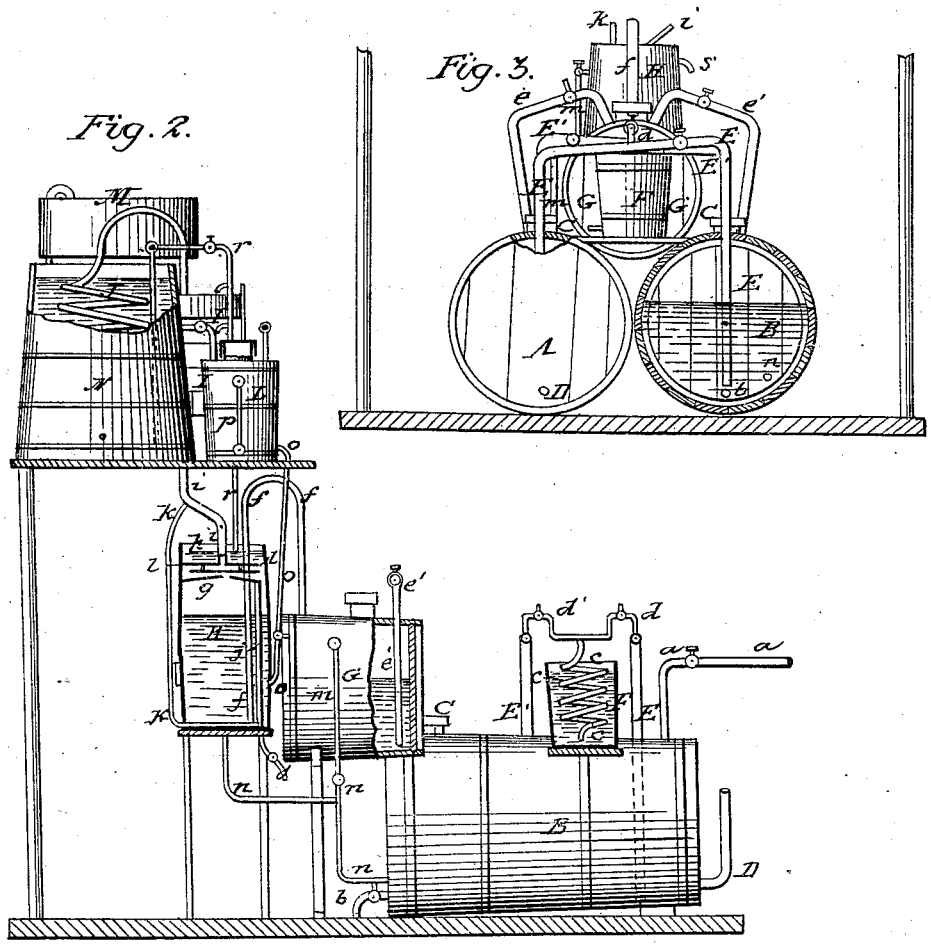
WITNESSES:
INVENTOR:

United States Patent Office.

ADOLPH A. MEYENDORFF, OF NEW YORK, N. Y.

Letters Patent No. 78,678, dated June 9, 1868.

---

IMPROVED DISTILLING-APPARATUS.

---

*The Schedule referred to in these Letters Patent and making part of the same.*

---

TO ALL WHOM IT MAY CONCERN:

Be it known that I, ADOLPH A. MEYENDORFF, of New York, in the county and State of New York, have invented a new and improved Distilling-Apparatus; and I do hereby declare that the following is a full, clear, and exact description thereof, which will enable others skilled in the art to make and use the same, reference being had to the accompanying drawings, forming part of this specification.

Figure 1, Sheet I, represents a plan or top view of my improved distilling-apparatus.

Figure 2, Sheet II, is a side elevation, partly in section, of the same.

Figure 3, Sheet II, is a front elevation, partly in section, of the same.

Similar letters of reference indicate corresponding parts.

This invention relates to a new distilling-apparatus, which is so arranged that it will distill directly from the mash, and so that none of the alcoholic contents of the mash are lost, that the spirits are separated according to their degree of purity, and that the condensed liquid in the rectificator will be decomposed so as to give off any alcoholic parts that may remain in it.

The invention consists, first, in the use, in one apparatus, of two stills, which are connected by means of pipes, in such manner that the vapors arising from one still will be forced through the mash in the other, so as to take up all the alcohol that would otherwise remain in the second still. By this arrangement, none of the alcohol is lost in the second still, and when its mash has been all spent, it is refilled, and the pipe-connection is so changed that the vapors arising from the second still will be conducted through the mash of the first still with the aforesaid results. Thus all the alcoholic contents of both stills are completely extracted by alternately driving the vapors of one through the mash of the other.

The invention consists, second, in arranging, in connection with the aforesaid double still, a small testing-apparatus, by which the strength of the vapors arising from the first still can be ascertained. This testing-apparatus is a tub, filled with cooling-liquid, and a worm in it, through which the vapor can be made to pass. The worm is, by means of pipes, connected with both stills, but communication is only opened by the pipe which carries the vapors from one still into the other. In the worm, a portion of these vapors is condensed, and their strength can be ascertained. When they are found to be too weak, it is a sign that the mash in the first still has been spent, and that new mash is required. By means of this testing-apparatus, the distilling process is greatly simplified, as the strength of the mash can be proved directly from the still.

The invention consists, third, in the use and arrangement, between the still and rectificator, of a vapor-collector, in which all the vapors arising from the mash are conducted, and in which the weakest contents of the vapors are condensed, said collector being not cooled by any artificial means, only having its metallic surfaces for condensing-surfaces. By the use of this collector, all the actually worthless contents of the vapors are separated from the low-wines, and do not injure the latter.

The invention consists, fourth, in the manner of constructing the rectificator, and of connecting it with the stills, with the vapor-collector, with the finished-spirit condenser, and with a vessel containing decomposing-ingredients. The rectificator has two false bottoms. Into its lowermost compartment are conducted, through a pipe from the rectificator, the vapors which rise through perforations in the lower false bottom, into the central chamber, in which a detaining-plate or plates are arranged. The upper compartment of the rectificator is filled with cooling-liquid, and the vapors striking against its bottom are partly condensed, so as to give off their low-wines. Those vapors which are not condensed in the rectificator are, by a pipe, conducted to the column or finished-spirit condenser, and thence to the worm. The vessel containing the aforesaid chemical decomposing-ingredients is, by a pipe, connected with the lower part of the rectificator, and the said ingredients can be let into the condensed spirits to decompose them, to make them yield their alcoholic contents, or the ingredients may be used to give taste to the liquid.

Those spirits which condense in the central compartment of the rectificator, and in the pipe leading to the column, are not allowed to mix with the low-wines in the lower part of the rectificator, nor with those in the vapor-collector, but are conducted separately to a suitable receptacle, to be used as they are, or to be redistilled. The low-wines in the lower part of the rectificator, as well as those in the vapor-collector, can be reconducted to the still.

The invention finally consists in the use of the aforesaid vessel containing the decomposing or flavoring-ingredients, in combination with a distilling-apparatus. By its use, the process of decomposing or flavoring can be carried on during the process of distillation, while heretofore it was only carried on in separate vessels, into which the products of condensation had to be conducted from the distilling-apparatus.

A and B are the two stills or boilers. The same are made in the form of horizontal cylinders, arranged side by side, as shown, or they are set upright, or otherwise arranged in any suitable manner, of suitable size and construction.

C C are man-holes, in the top of the stills, for cleaning the vessel. D are pipes for letting in the mash. $a$ $a$ are pipes for letting the steam into the mash. $b$ $b$ are pipes for drawing off the spent mash. Each still has a hole, C, and a pipe, $a$, $b$, and D.

The stills A B are connected with each other by means of pipes E E', for conducting the vapors from one still to and into the mash in the other still.

The pipe E, which leads from the still A to B, commences near the top of A, and leads to near the bottom of B, as in fig. 3, so as to carry the vapors from A into the mash in B. The pipe E' leads from the top of B to the bottom of A, to carry the vapors from B to A.

Each of the pipes E E' has a tap or stop-cock, by which it can be closed.

That pipe which leads to the still in which all the vapors are to be collected is open, the other closed.

In the drawing, the still, B, is represented as the collective-still; the pipe E is open, and E' closed.

F represents a tub, arranged between or above the stills A B, or in any other suitable position. In it is arranged a worm, $c$, which is, by means of pipes $d$ $d'$, connected with the pipes E E' respectively, as in fig. 2.

Each pipe $d$ $d'$ has a tap. That one which is connected with the operating-pipe E or E', may be opened from time to time to let some of the vapor, passing from the first still to the collective-still, into the worm, and, as the worm is surrounded by cooling-liquid, such vapors are condensed in it, and can be drawn off to test the strength of the mash in the first still.

G represents a vessel, which is connected with both stills A B, by means of pipes $e$ $e'$, respectively. Each of these pipes commences at the top of its still, and leads to near the bottom of the vessel G. The pipe leading from the collective-still to the vessel G is opened, to let the vapors from the collective-still all into G.

In the vessel G, the weakest parts of the vapors condense, and remain as residue upon the bottom of G, while the vapors are, by a pipe, $f$, carried to a rectificator, H, into the lower compartment of the same.

The rectificator is an upright vessel, divided, by two horizontal partitions $g$ and $h$, into three compartments. The upper compartment is filled with cooling-liquid. The vapors are let into the lowermost compartment, and rise, through a perforation in the partition $g$, into the middle compartment. Whatever condenses in the lower compartment remains therein. Whatever condenses in the middle compartment, or in the pipe $i$, in which the vapors are carried to a column, I, does not fall back into the lower compartment, but is detained by the plate $g$, and flows thence, through a pipe, $j$, into a suitable receptacle. The upper part of the pipe $i$ does, by means of a pipe, K, also communicate with the pipe $j$, or, if desired, the pipe K may lead to a separate receptacle. In the middle chamber of the rectificator are arranged suitable detaining-devices $l$ $l$, to prevent the rapid escape of the vapors.

From the column I, the vapors may be carried to a worm, T, of suitable construction.

The vapor-collector G, as well as the rectificator H, are both provided with gauges $m$ $m$, to indicate the height of the residue in them. They are also both connected, by means of suitable pipes $n$ $n$, with the lower part of either still, or with both of the stills, to allow the return of their condensed vapors into the mash.

L represents a vessel, arranged above the rectificator, or otherwise, so that a pipe, $o$, leading from it will carry its contents to the rectificator. The vessel L is charged with suitable ingredients for decomposing or flavoring the residue in the rectificator.

From a vessel, M, the cooling-liquid used in the tub F, as well as in the rectificator, column, and in the tub N that surrounds the worm, is or may be taken. The vessel L may also have a gauge, $p$, as shown.

A series of vessels, L, may be arranged on one apparatus, if desired.

$r$ is a pipe, for conducting water to the upper chamber of the rectificator, which water or other cooling-liquid is discharged through a pipe, S.

I claim as new, and desire to secure by Letters Patent—

1. Arranging in one distilling-apparatus two stills, and connecting them by means of pipes, in such manner that the vapors of one can be forced through the mash in the other, substantially as herein shown and described, for the purpose of completely extracting the alcoholic contents of the mash, as set forth.

2. Arranging, in combination with the double still A B, a testing-apparatus, consisting of a tub, $f$, and worm $c$, and so operating that the strength of the mash can be ascertained directly from the still, as set forth.

3. The vapor-collector G, arranged between the still and rectificator H of a distilling-apparatus, substantially as herein shown and described, for the purpose of condensing the weakest and most impure contents of the vapor, as set forth.

4. The rectificator H, when provided with false bottoms $g$ and $h$, between which detaining-devices $l$ $l$ are arranged, and, when so arranged, that all liquids condensed above the lower false bottom $g$ are, by means of pipe $j$ and K, or $j$ alone, separated from the low-wines in the lower compartment of the rectificator, substantially as herein shown and described.

5. The vessel L, containing decomposing or flavoring-ingredients, when arranged in combination and connection with the rectificator of a distilling-apparatus, substantially as herein shown and described.

6. A distilling-apparatus, consisting of two boilers A B of a vapor-collector, G, rectificator H, column I, and final condenser J, and of a vessel, L, containing decomposing or flavoring-ingredients, all made and operating substantially as and for the purpose herein shown and described.

ADOLPH A. MEYENDORFF.

Witnesses:
  WM. F. MCNAMARA,
  ALEX. F. ROBERTS.